(12) United States Patent
Su et al.

(10) Patent No.: US 10,013,076 B2
(45) Date of Patent: Jul. 3, 2018

(54) DUAL SPRING KEY STRUCTURE

(71) Applicants: LITE-ON ELECTRONICS (GUANGZHOU) LIMITED, Guangzhou (CN); Lite-On Technology Corporation, Taipei (TW)

(72) Inventors: Chih-Wen Su, Taipei (TW); Rong-Shu Li, Guangzhou (CN)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 33 days.

(21) Appl. No.: 15/427,062

(22) Filed: Feb. 8, 2017

(65) Prior Publication Data

US 2018/0095544 A1 Apr. 5, 2018

(30) Foreign Application Priority Data

Sep. 30, 2016 (CN) .......................... 2016 1 0876552

(51) Int. Cl.
*H01H 13/7073* (2006.01)
*G06F 3/02* (2006.01)

(52) U.S. Cl.
CPC ....... *G06F 3/0202* (2013.01); *H01H 13/7073* (2013.01); *H01H 2235/00* (2013.01); *H01H 2235/03* (2013.01)

(58) Field of Classification Search
CPC ............. H01H 13/705; H01H 13/7073; H01H 2235/00; H01H 2235/03; H01H 2235/018;

(Continued)

(56) References Cited

U.S. PATENT DOCUMENTS

| 4,339,643 | A | * | 7/1982 | Murmann | ............ | H01H 15/102 |
| | | | | | | 200/533 |
| 4,367,380 | A | * | 1/1983 | Larson | ................. | H01H 13/705 |
| | | | | | | 200/5 R |

(Continued)

FOREIGN PATENT DOCUMENTS

| CN | 102299017 | 12/2011 |
| CN | 204088129 | 1/2015 |

OTHER PUBLICATIONS

"Office Action of Taiwan Counterpart Application," dated May 19, 2017, p. 1-p. 5, in which the listed references were cited.

*Primary Examiner* — Vanessa Girardi
(74) *Attorney, Agent, or Firm* — JCIPRNET

(57) ABSTRACT

An input device includes at least one key structure and a film circuit board disposed below the key structure. The key structure includes a top cover, a plunger, a sleeve, a rod, a first elastic element, a second elastic element and a bottom cover. The plunger is assembled on the top cover and has a protruding portion protruding from a first opening of the top cover and a guiding portion. The sleeve is assembled inside the plunger. The rod is movably disposed in the sleeve. The first elastic element is disposed in the rod, wherein the guiding portion passes through the first elastic element so that a first end of the first elastic element leans against the plunger. The bottom cover having a second opening locks the top cover. A second end and a third end of the second elastic element respectively lean against the sleeve and the bottom cover.

12 Claims, 14 Drawing Sheets

(58) Field of Classification Search
CPC . H01H 221/04; H01H 221/082; G06F 3/0202
USPC .................................................. 200/290, 345
See application file for complete search history.

(56) References Cited

U.S. PATENT DOCUMENTS 4,417,115 A * 11/1983 Desmarais ........... H01H 13/564
                                                                       200/5 A
5,120,923 A *  6/1992 Kato .................... H01H 13/705
                                                                       200/341
5,201,824 A *  4/1993 Kato .................... H01H 13/705
                                                                       200/341
5,715,932 A *  2/1998 Motoyama ............. H01H 13/50
                                                                       200/345

* cited by examiner

DUAL SPRING KEY STRUCTURE

CROSS-REFERENCE TO RELATED APPLICATION

This application claims the priority benefits of China patent application no. 201610876552.8, filed on Sep. 30, 2016. The entirety of the above-mentioned patent application is hereby incorporated by reference herein and made a part of this specification.

BACKGROUND OF THE INVENTION

Field of the Invention

The invention relates to an input device, and particularly relates to an input device having a key structure with a mechanical keys feel.

Description of Related Art

A keyboard is the most important input interface of a personal computer and a notebook, and by pressing different keys, a user may operate the computer to execute corresponding operations. The keyboards can be simply divided into mechanical keys and thin-film keys according to key structures thereof. The mechanical key has advantages of a best handfeel, a longest service life and a short trigger stroke, and disadvantages of a complicate manufacturing process of an adopted printed circuit board and a high price. On the other hand, since the thin-film key is configured with a thin-film circuit board, it has advantages of light weight, low price and simple manufacturing process, though disadvantages thereof are poor handfeel, short service life and long trigger stroke. Therefore, to design a key structure having both of the advantages of the mechanical keys and the thin-film keys becomes an important issue for manufactures in product development.

SUMMARY OF THE INVENTION

The invention is directed to an input device having a key structure, which has advantages of a handfeel of a mechanical key and a low cost of a thin-film key.

The invention provides an input device including at least one key structure and a thin-film circuit board. The key structure includes a top cover, a plunger, a sleeve, a rod, a first elastic element, a second elastic element and a bottom cover. The top cover has a first opening. The plunger is assembled on the top cover and has a protruding portion and a guiding portion connected to the protruding portion, where the protruding portion of the plunger protrudes from the first opening of the top cover. The sleeve is assembled inside the plunger. The rod is movably disposed in the sleeve. The first elastic element is disposed in the rod, where the guiding portion of the plunger passes through the first elastic element so that a first end of the first elastic element leans against the plunger. The second elastic element sleeves the sleeve. The bottom cover and the top cover are locked to each other, and the bottom cover has a second opening. A second end and a third end of the second elastic element opposite to each other respectively lean against the sleeve and the bottom cover. The thin-film circuit is disposed under the key structure. When the protruding portion of the plunger is pressed, the second elastic element is elastically deformed to make the rod to pass through the second opening on the bottom cover to contact the thin-film circuit to gain a reaction force, and the reaction force forces the rod to retract into the second opening and trigger the thin-film circuit board due to an elastic deformation of the first elastic element.

In an embodiment of the invention, the thin-film circuit board at least includes a first patterned circuit thin-film, a second patterned circuit thin-film and an isolation thin-film. The isolation thin-film is located between the first patterned circuit thin-film and the second patterned circuit thin-film, and has a first through hole corresponding to the second opening of the bottom cover. When the protruding portion of the plunger is pressed, the rod contacts the first patterned circuit thin-film of the thin-film circuit board to deform the first patterned circuit thin-film and contacts the second patterned circuit thin-film through the first through hole of the isolation thin-film to trigger the thin-film circuit board.

In an embodiment of the invention, the first elastic element and the second elastic element are respectively a compression spring, and an external diameter of the second elastic element is greater than an external diameter of the first elastic element.

In an embodiment of the invention, a diameter of the first through hole of the isolation thin-film is inversely proportional to a spring constant of the first elastic element.

In an embodiment of the invention, the input device further includes a light source module, which is disposed under the key structure and includes a circuit board and at least one light-emitting diode electrically connected to the circuit board. The light source module is located between the key structure and the thin-film circuit board. The circuit board has a second through hole corresponding to the second opening of the bottom cover. When the protruding portion of the plunger is pressed, the rod passes through the second through hole to contact the thin-film circuit board.

In an embodiment of the invention, the bottom cover of the key structure further has an accommodating portion, and the light-emitting diode of the light source module is disposed corresponding to the accommodating portion of the bottom cover.

In an embodiment of the invention, the input device further includes a light source module, disposed under the key structure, and comprising a circuit board and at least one light-emitting diode electrically connected to the circuit board, wherein the thin-film circuit board is located between the key structure and the light source module, the bottom cover of the key structure further has an accommodating portion, the thin-film circuit board has a hole corresponding to the accommodating portion of the bottom cover, and the light-emitting diode of the light source module is disposed corresponding to the hole of the thin-film circuit board.

In an embodiment of the invention, the input device further includes a planar light source, which is disposed under the key structure, where the thin-film circuit board is located between the planar light source and the key structure.

In an embodiment of the invention, materials of the top cover and the bottom cover of the key structure are all transparent materials.

In an embodiment of the invention, the input device further includes at least one light source, which is disposed on the thin-film circuit board, and is electrically connected to the thin-film circuit board, where the light source and the thin-film circuit board define a backlight module.

In an embodiment of the invention, the key structure further includes an elastic piece, which is inserted on the bottom cover, and is configured to provide a section feel when the protruding portion of the plunger is pressed.

In an embodiment of the invention, the key structure further includes a keycap, which is assembled on the protruding portion of the plunger.

According to the above description, in the design of the key structure of the invention, since the key structure has the plunger, the sleeve, the rod, and the first elastic element, when the protruding portion of the plunger is pressed, the second elastic element is elastically deformed to make the rod passing through the bottom cover to contact an object (for example, the thin-film circuit board) to gain an reaction force, and the reaction force forces the rod to retract into the second opening of the bottom cover due to an elastic deformation of the first elastic element. In this way, the key structure of the invention has a handfeel and a trigger stroke of mechanical keys. Moreover, the design of the input device of the invention adopts the aforementioned key structure in collaboration with the thin-film circuit board, so that compared with the conventional mechanical keys in collaboration with a printed circuit board, the input device of the invention has advantages of a low cost and a light weight. In brief, the input device of the invention may have advantages of a handfeel of the mechanical keys and a low cost of the thin-film keys.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
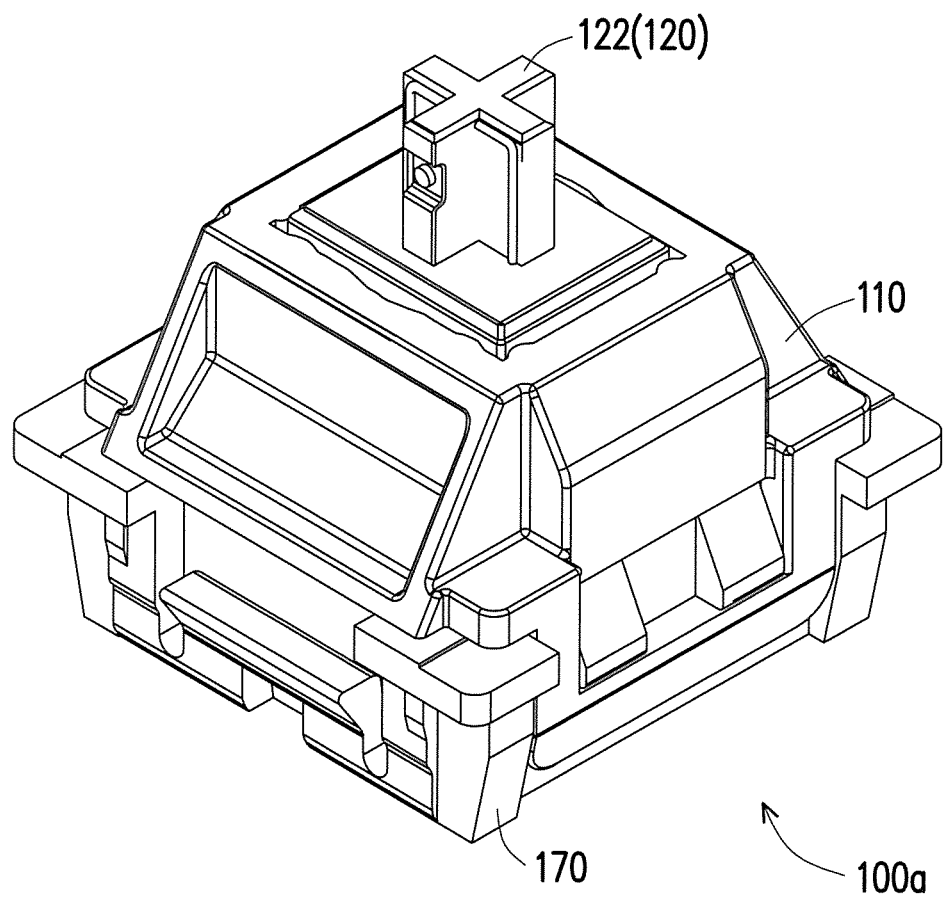
FIG. 1A is a three-dimensional view of a key structure according to an embodiment of the invention.
Figure 1B:
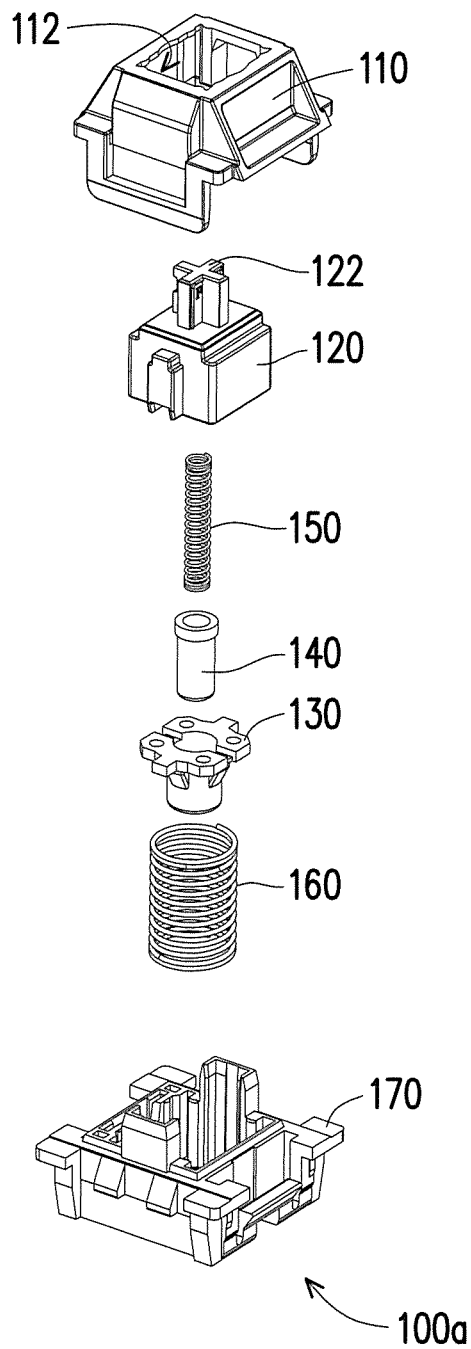
FIG. 1B is a three-dimensional exploded view of the key structure of FIG. 1A.
Figure 1C:
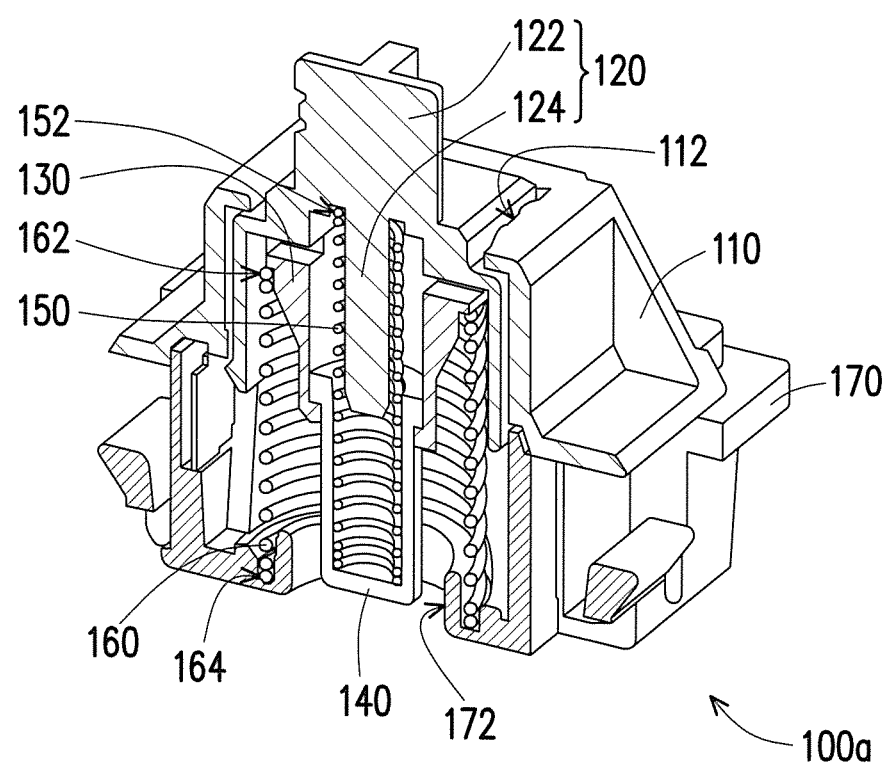
FIG. 1C is a partial cross-sectional and three-dimensional view of the key structure of FIG. 1A.

FIG. 1A is a three-dimensional view of a key structure according to an embodiment of the invention. FIG. 1B is a three-dimensional exploded view of the key structure of FIG. 1A. FIG. 1C is a partial cross-sectional and three-dimensional view of the key structure of FIG. 1A. Referring to FIG. 1A, FIG. 1B and FIG. 1C, the key structure 100a of the present embodiment includes a top cover 110, a plunger 120, a sleeve 130, a rod 140, a first elastic element 150, a second elastic element 160 and a bottom cover 170.

In detail, the top cover 110 has a first opening 112. The plunger 120 is assembled on the top cover 110 and has a protruding portion 122 and a guiding portion 124 connected to the protruding portion 122, where the protruding portion 122 of the plunger 120 protrudes from the first opening 112 of the top cover 110. The sleeve 130 is assembled inside the plunger 120. The rod 140 is movably disposed in the sleeve 130. The first elastic element 150 is disposed in the rod 140, where the guiding portion 124 of the plunger 120 passes through the first elastic element 150, so that a first end 152 of the first elastic element 150 leans against the plunger 120. The second elastic element 160 sleeves the sleeve 130. The bottom cover 170 and the top cover 110 are locked to each other, and the bottom cover 170 has a second opening 172. A second end 162 and a third end 164 of the second elastic element 160 opposite to each other respectively lean against the sleeve 130 and the bottom cover 170.

Referring to FIG. 1C, in the present embodiment, a material of the top cover 110 and the bottom cover 170 is, for example, a transparent material or an opaque material, which is not limited by the invention. The top cover 110 and the bottom cover 170 are locked to each other to fix the plunger 120, the sleeve 130, the rod 140, the first elastic element 150 and the second elastic element 160 in the top cover 110 and the bottom cover 170. The protruding portion 122 of the plunger 120 protrudes from the first opening 112 of the top cover 110 to facilitate user's pressing. The guiding portion 124 of the plunger 120 passes through the first elastic element 150, such that the first elastic element 150 is located between the guiding portion 124 and the rod 140, where the guiding portion 124 is configured to guide the first elastic element 150 to avoid a situation that the first elastic element 150 deviates from its original position during elastic deformation. The rod 140 is disposed in the sleeve 130, and the rod 140 may move up and down in the sleeve 130 due to the elastic deformation of the first elastic element 150 to produce a retraction phenomenon. The first elastic element 150 and the second elastic element 160 are, for example, respectively a compression spring, and an external diameter of the second elastic element 160 is greater than an external diameter of the first elastic element 150. The external diameter of the second elastic element 160 is, for example, 5.7 mm+/−0.05 mm, and the external diameter of the first elastic element 150 is, for example, 1.6 mm+/−0.05 mm, though the invention is not limited thereto. Moreover, a spring constant of the second elastic element 160 is greater than a spring constant of the first elastic element 150, i.e. the first elastic element 150 is liable to be deformed compared with the second elastic element.

When the protruding portion 122 of the plunger 120 is pressed, the second elastic element 160 is elastically deformed to make the rod 140 to pass through the second opening 172 on the bottom cover 170 to contact an object to gain a reaction force, and the reaction force forces the rod 140 to retract into the second opening 172 due to an elastic deformation of the first elastic element 150. Namely, when an external force is applied to the protruding portion 122 of the plunger 120, the second elastic element 160 is compression deformed due to the external force and drives the rod 140 to move downward to pass through the second opening 172 of the bottom cover 170 to contact the object (for example, a thin-film circuit board, not shown), which is referred to as a trigger stroke. The object provides the reaction force to force the rod 140 to move upward and retract into the second opening 172 of the bottom cover 170 due to a compression deformation of the first elastic element 150 under the reaction force. Now, the protruding portion 122 of the plunger 120 still moves down under the external force, and the rod 140 is retracted to the second opening 172 and keeps contacting the object, which is referred to as a bottom stroke.

In brief, in the design of the key structure 100a of the present embodiment, the key structure 100a adopts an elastic strength (i.e. an elastic force of the second elastic element 160) the same with that of the mechanical keys, and an elastic strength (i.e. an elastic force of the first elastic element 150) producing the reaction force when the plunger 120 and providing a continuous press stroke. Therefore, the key structure 100a may have the handfeel and the trigger stroke of the mechanical keys.

It should be noted that reference numbers of the components and a part of contents of the aforementioned embodiment are also used in the following embodiment, where the same reference numbers denote the same or like components, and descriptions of the same technical contents are omitted. The aforementioned embodiment can be referenced for descriptions of the omitted parts, and detailed descriptions thereof are not repeated in the following embodiment.

Figure 2:
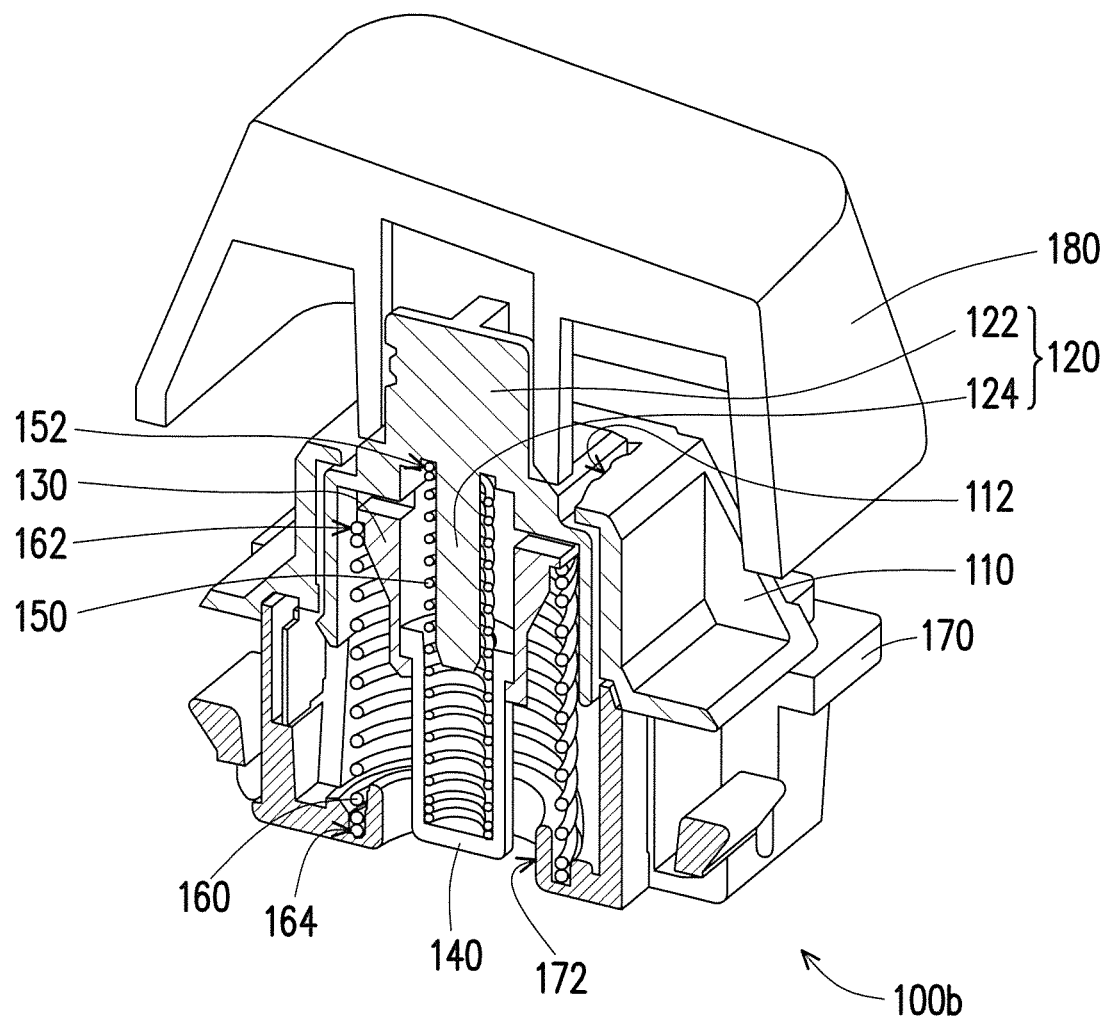
FIG. 2 is a partial cross-sectional and three-dimensional view of a key structure according to another embodiment of the invention.

FIG. 2 is a partial cross-sectional and three-dimensional view of a key structure according to another embodiment of the invention. Referring to FIG. 1C and FIG. 2, the key structure 100b of the present embodiment is similar to the key structure 100a of FIG. 1C, and a difference there between is that the key structure 100b of the present embodiment further includes a keycap 180, which is assembled on the protruding portion 122 of the plunger 120. The keycap 180 may serve as an upmost thin-film member of the key structure 100b, and a user may operate the key structure 100b through the keycap 180.

Figure 3A:
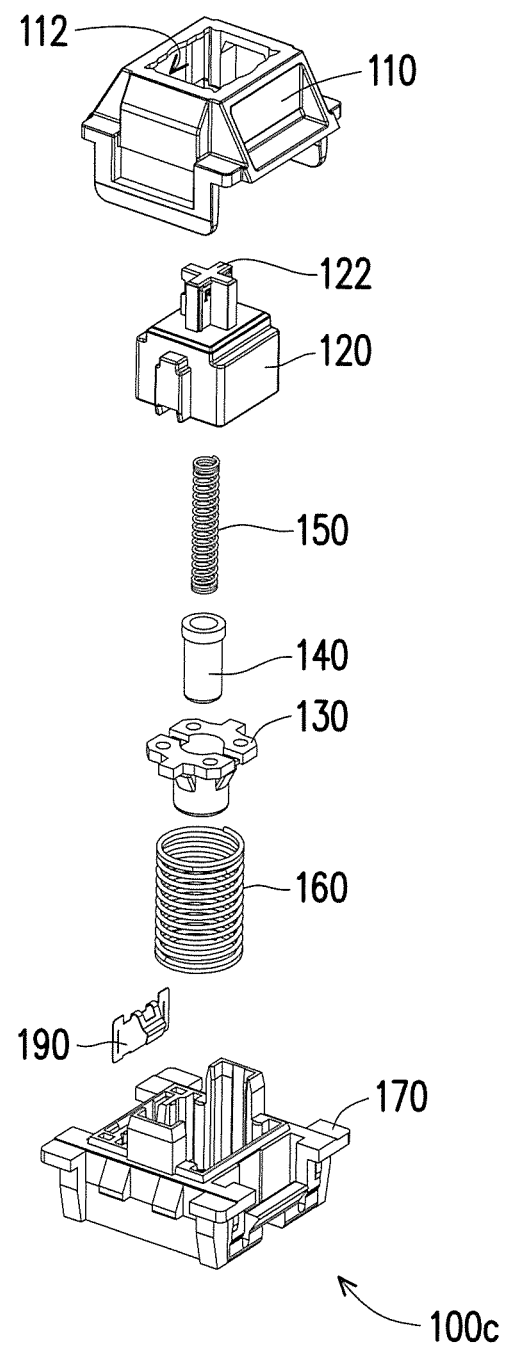
FIG. 3A is a three-dimensional exploded view of a key structure according to another embodiment of the invention.
Figure 3B:
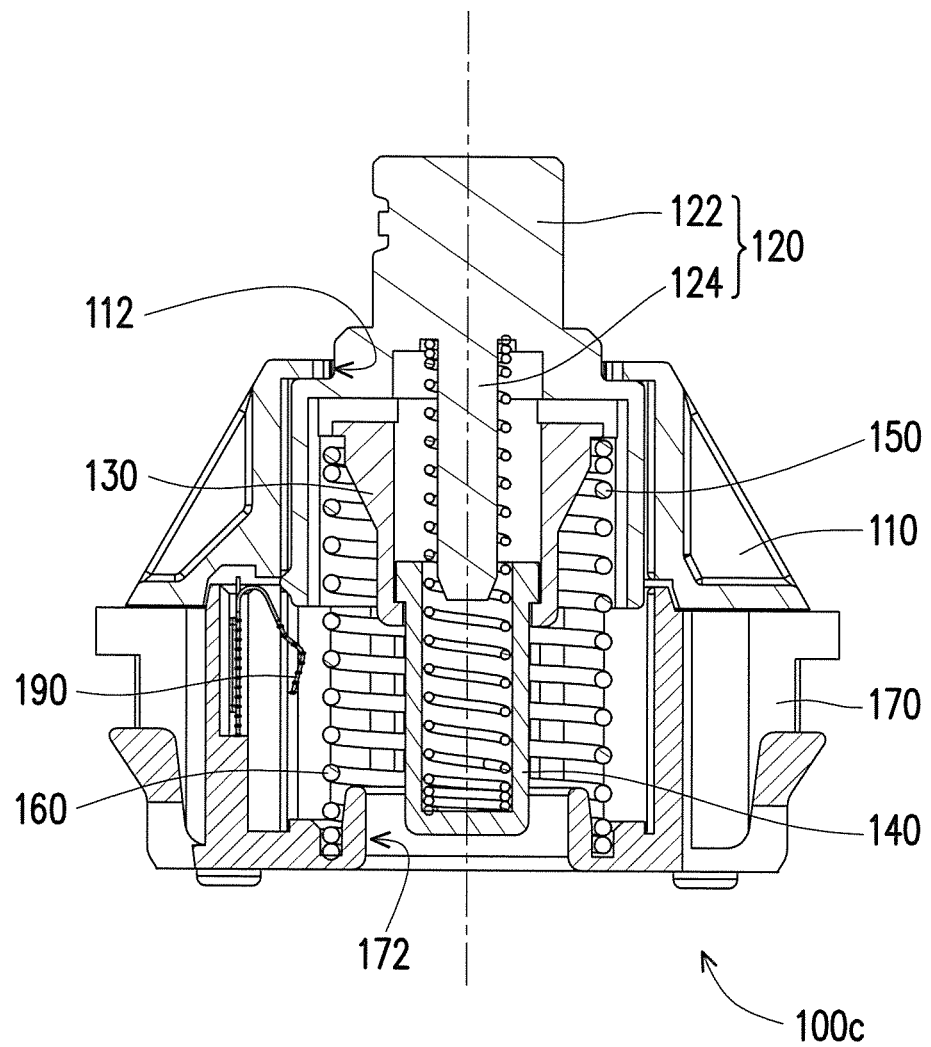
FIG. 3B is a cross-sectional view of the key structure of FIG. 3A.

FIG. 3A is a three-dimensional exploded view of a key structure according to another embodiment of the invention, and FIG. 3B is a cross-sectional view of the key structure of FIG. 3A. Referring to FIG. 1B, FIG. 1C, FIG. 3A and FIG. 3B, the key structure 100c of the present embodiment is similar to the key structure of FIG. 1B and FIG. 1C, and a difference there between is that the key structure 100c of the present embodiment further includes an elastic piece 190, which is inserted on the bottom cover 170, and is configured to provide a section feel when the protruding portion 122 of the plunger 120 is pressed, such that the user may have a good operational handfeel when the user presses and releases the protruding portion 122. In brief, during a whole operation process of the key structure 100c, a feedback force is divided into two sections due to configuration of the elastic piece 190, and there will be a resilience when a key stroke breaks through a boundary of the two sections, and the user may feel two sections before pressing a key to the bottom, so as to enhance the operational handfeel.

Figure 4A:
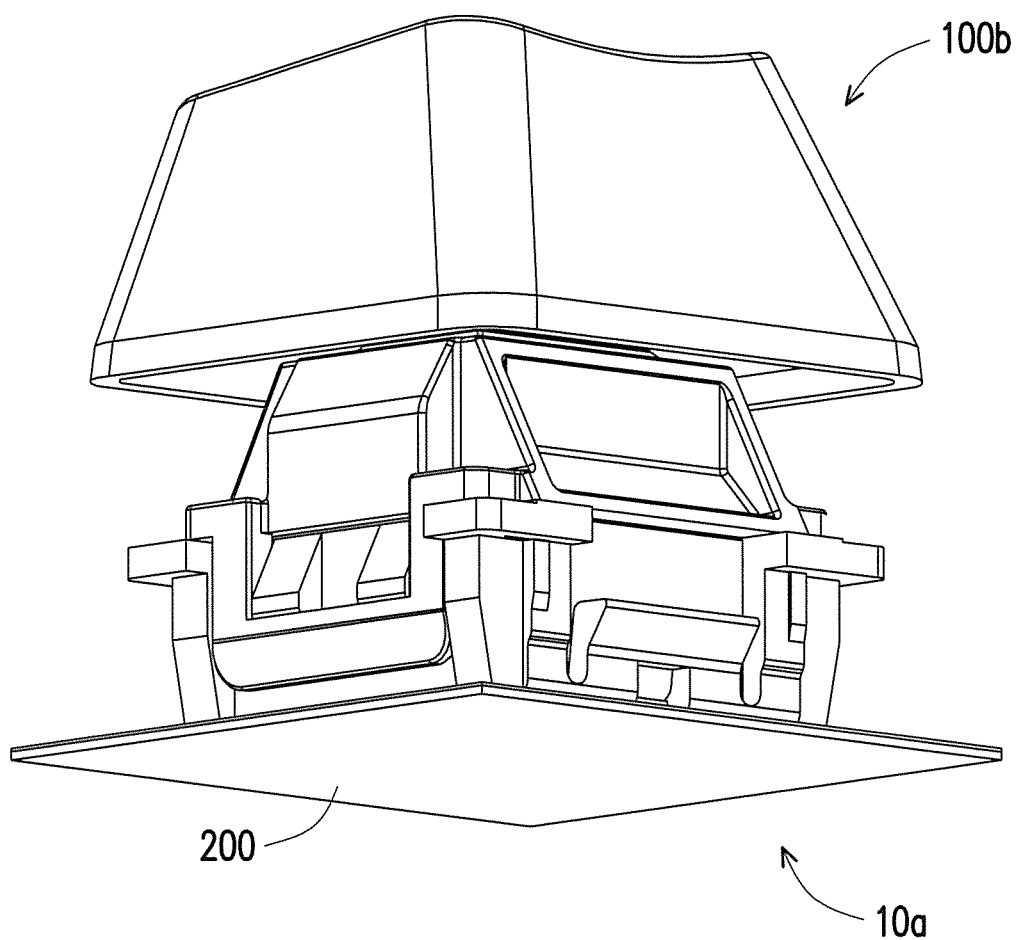
FIG. 4A is a three-dimensional view of an input device according to an embodiment of the invention.
Figure 4B:
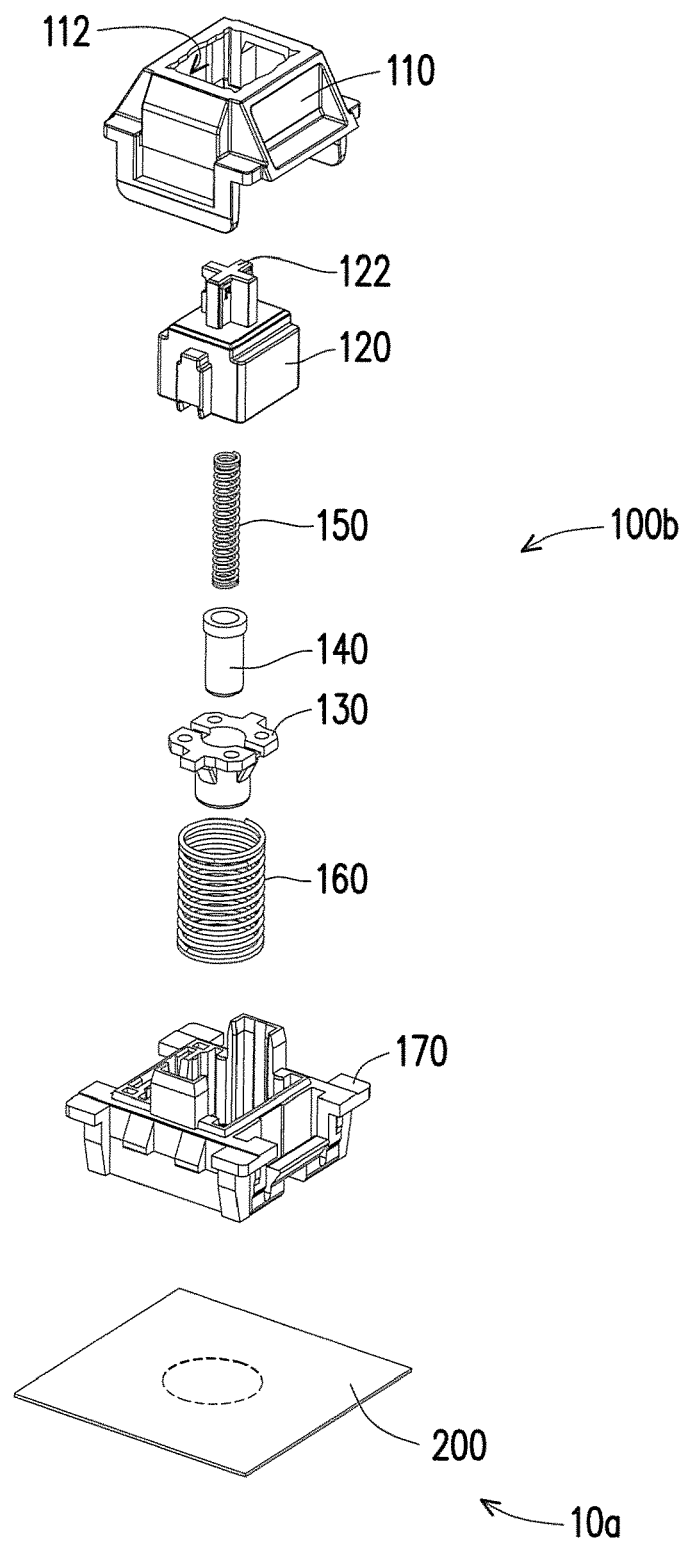
FIG. 4B is a three-dimensional exploded view of the input device of FIG. 4A.
Figure 4C:
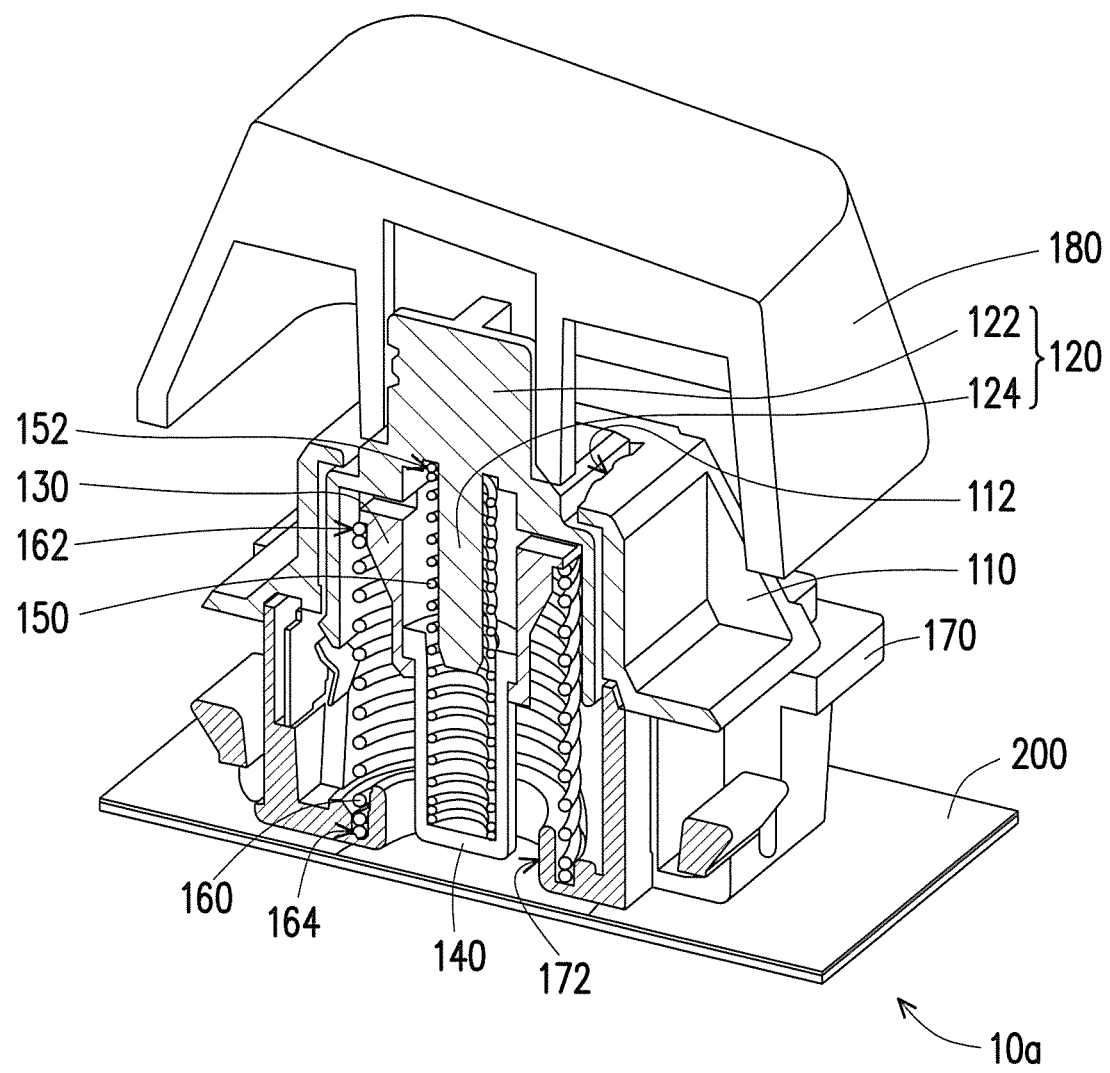
FIG. 4C is a partial cross-sectional and three-dimensional view of the input device of FIG. 4A.
Figure 4D:
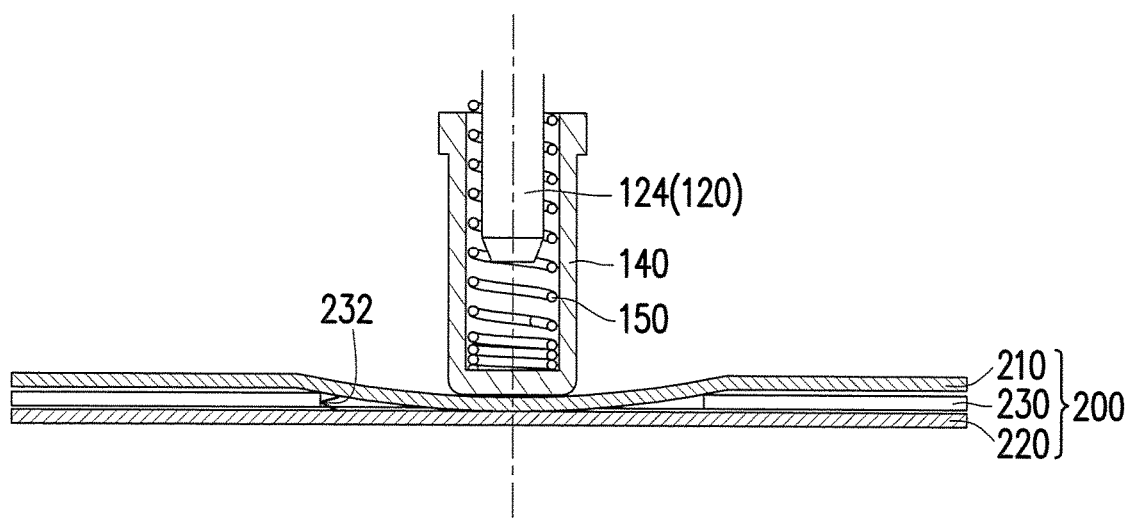
FIG. 4D is a schematic diagram of a situation that a rod of the input device of FIG. 4A contact a thin-film circuit board.

FIG. 4A is a three-dimensional view of an input device according to an embodiment of the invention. FIG. 4B is a three-dimensional exploded view of the input device of FIG. 4A. FIG. 4C is a partial cross-sectional and three-dimensional view of the input device of FIG. 4A. FIG. 4D is a schematic diagram of a situation that the rod of the of the input device of FIG. 4A contact a thin-film circuit board. For simplicity's sake, the keycap 180 is omitted in FIG. 4B. Referring to FIG. 4A, FIG. 4B and FIG. 4C, the input device 10a of the present embodiment includes at least one of the aforementioned key structures 100a, 100b, 100c (and the key structure 100b is taken as an example for description) and a thin-film circuit board 200. The thin-film circuit board 200 is disposed under the key structure 100b. When the protruding portion 122 of the plunger 120 is pressed, the second elastic element 160 is elastically deformed to make the rod 140 to pass through the second opening 172 of the bottom cover 170 to contact the thin-film circuit board 200 and gain a reaction force, and the reaction force forces the rod 140 to retract into the second opening 172 and trigger the thin-film circuit board 200 due to an elastic deformation of the first elastic element 150.

In detail, referring to FIG. 4C and FIG. 4D, the thin-film circuit board 200 of the present embodiment includes at least one first patterned circuit thin-film 210, a second patterned circuit thin-film 220 and an isolation thin-film 230. The isolation thin-film 230 is located between the first patterned circuit thin-film 210 and the second patterned circuit thin-film 220, and has a first through hole 232 corresponding to the second opening 172 of the bottom cover 170. Therefore, the first patterned circuit thin-film 210, the isolation thin-film 230 and the second patterned circuit thin-film 220 have air gaps there between. When the protruding portion 122 of the plunger 120 is pressed, the rod 140 contacts the first patterned circuit thin-film 210 of the thin-film circuit board 200 to deform the first patterned circuit thin-film 210 and contacts the second patterned circuit thin-film 220 through the first through hole 232 of the isolation thin-film 230 to trigger the thin-film circuit board 200.

Particularly, a diameter of the first through hole 232 of the isolation thin-film 230 of the present embodiment is inversely proportional to the spring constant of the first elastic element 150. For example, when the diameter of the first through hole 232 of the isolation thin-film 230 is larger, the first patterned circuit thin-film 210 only requires a smaller trigger pressure in order to produce a bridge phenomenon with the second patterned circuit thin-film 220 to trigger the thin-film circuit board 200; conversely, when the diameter of the first through hole 232 of the isolation thin-film 230 is smaller, the first patterned circuit thin-film 210 requires a larger trigger pressure in order to produce the bridge phenomenon with the second patterned circuit thin-film 220 to trigger the thin-film circuit board 200. Therefore, the spring constant of the first elastic element 150 can be adjusted to achieve the required trigger stroke.

In brief, in the design of the input device 10a of the present embodiment, when the protruding portion 122 of the plunger 120 of the key structure 100b is pressed, the second elastic element 160 is elastically deformed to make the rod 140 to pass through the bottom cover 170 to contact the thin-film circuit board 200 and gain a reaction force, and the reaction force forces the rod 140 to retract into the second opening 172 of the bottom cover 170 due to the elastic deformation of the first elastic element 150. Therefore, the key structure 100b of the present embodiment may provide the handfeel and trigger stroke of the mechanical keys. Since the input device 10a of the present embodiment adopts the key structure 100b with the mechanical key handfeel in collaboration with the thin-film circuit board 200, compared to the conventional mechanical key in collaboration with the printed circuit board, the input device 10a of the present embodiment has advantages of a lower cost and a light weight.

Figure 5:
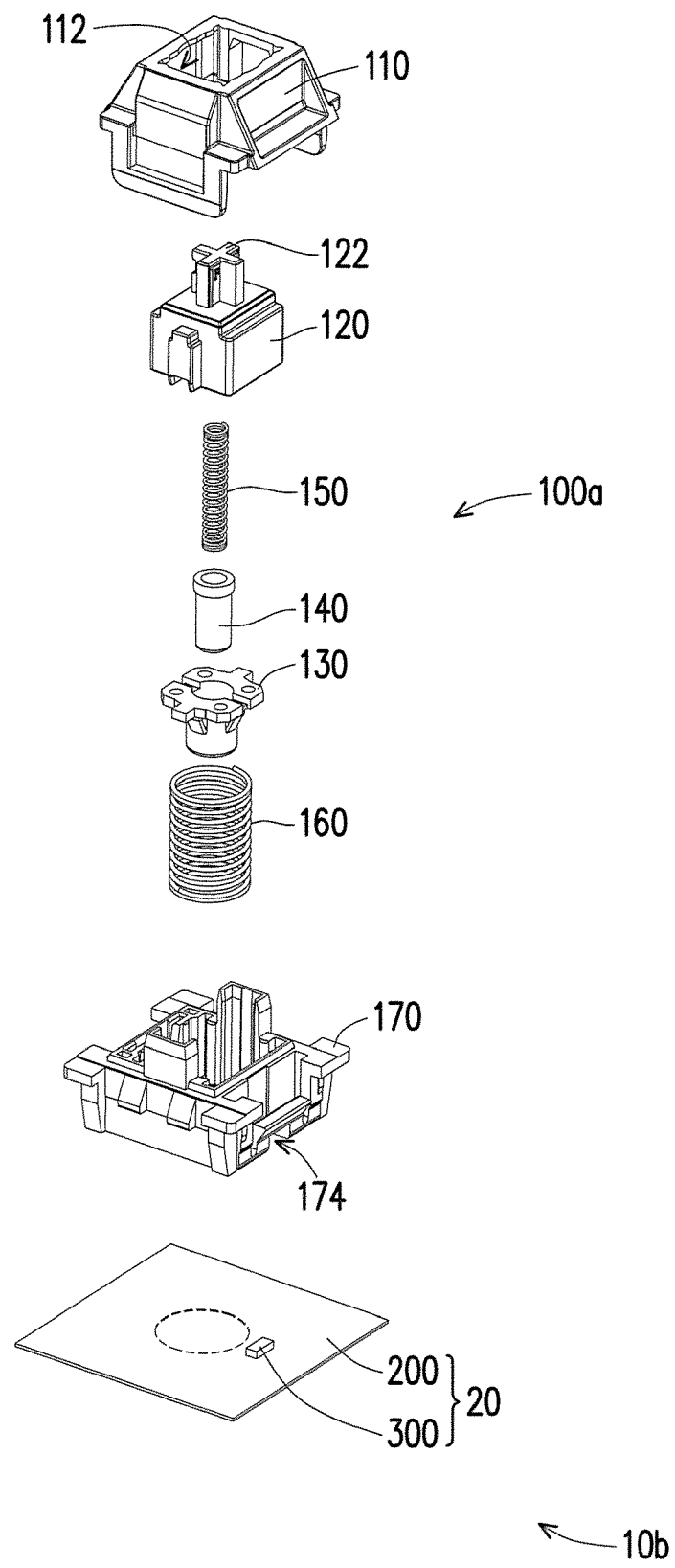
FIG. 5 is a three-dimensional exploded view of an input device according to another embodiment of the invention.

FIG. 5 is a three-dimensional exploded view of an input device according to another embodiment of the invention. Referring to FIG. 4B and FIG. 5, the input device 10b of the present embodiment is similar to the input device 10a of FIG. 4B, and a difference there between is that the input device 10b of the present embodiment adopts the key structure 100a of FIG. 1B, and the input device 10b of the present embodiment further includes at least one light source 300, which is disposed on the thin-film circuit board 200 to electrically connect the thin-film circuit board 200. The light source 300 and the thin-film circuit board 200 define a backlight module 20, and the material of the top cover 110 and the bottom cover 170 of the key structure 100a is preferably a transparent material. In brief, the backlight module 20 may provide a light source to light the key structure 100b. As shown in FIG. 5, the light source 300 can be configured corresponding to an accommodating portion 174 of the bottom cover 170, such that the light emitted by the light source 300 can be transmitted upward to pass through the top cover 110 from the accommodating portion 174 of the bottom cover 170. The light source 300 is, for example, a light-emitting diode, though the invention is not limited thereto.

Figure 6A:
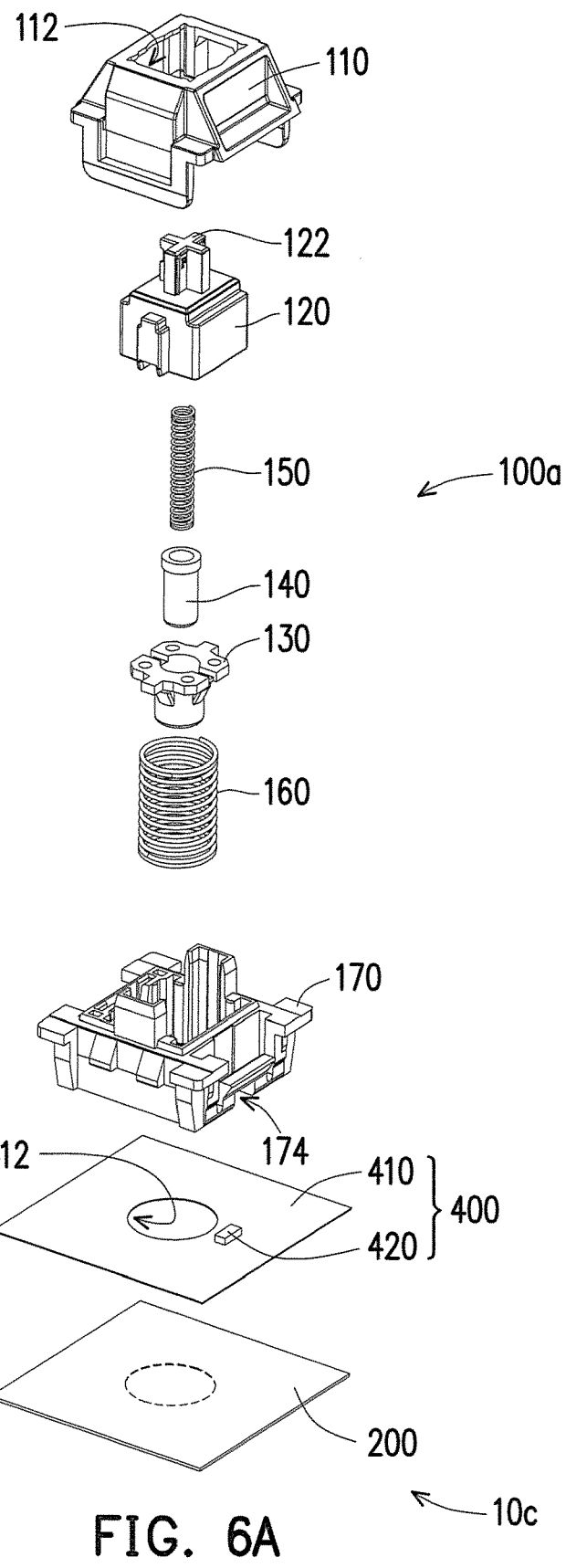
FIG. 6A is a three-dimensional exploded view of an input device according to another embodiment of the invention.

FIG. 6A is a three-dimensional exploded view of an input device according to another embodiment of the invention. Referring to FIG. 4B and FIG. 6A, the input device 10c of the present embodiment is similar to the input device 10a of FIG. 4B, and a difference there between is that the input device 10c of the present embodiment adopts the key structure 100a of FIG. 1B, and the input device 10c further includes a light source module 400, which is disposed under the key structure 100a. In detail, the light source module 400 of the present embodiment includes a circuit board 410 and at least one light-emitting diode 420 electrically connected to the circuit board 410. The light source module 400 is located between the key structure 100b and the thin-film circuit board 200, and the circuit board 410 has a second through hole 412 corresponding to the second opening 172 (referring to FIG. 1C) of the bottom cover 170. When the protruding portion 122 of the plunger 120 is pressed, the rod 140 sequentially passes through the second opening 172 of the bottom cover 170 and the second through hole 412 of the circuit board 410 to contact the thin-film circuit board 200. The light-emitting diode 420 of the light source module 400 is disposed corresponding to an accommodating portion 174 of the bottom cover 170. Namely, the light of the light-emitting diode 420 can be transmitted upward to pass through the top cover 110 from the accommodating portion 174 of the bottom cover 170.

Figure 6B:
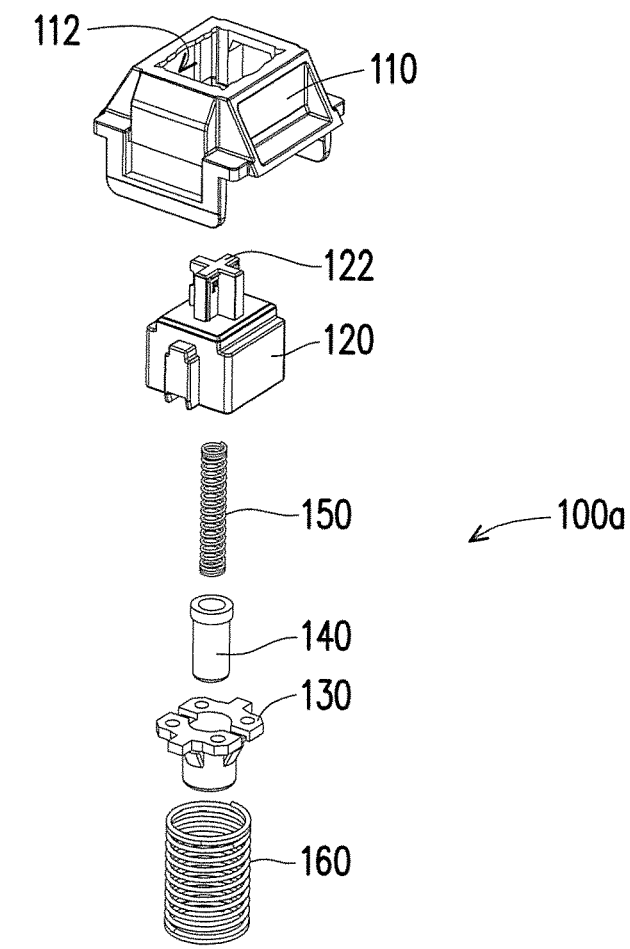
FIG. 6B is a three-dimensional exploded view of an input device according to another embodiment of the invention.
Figure 6B:
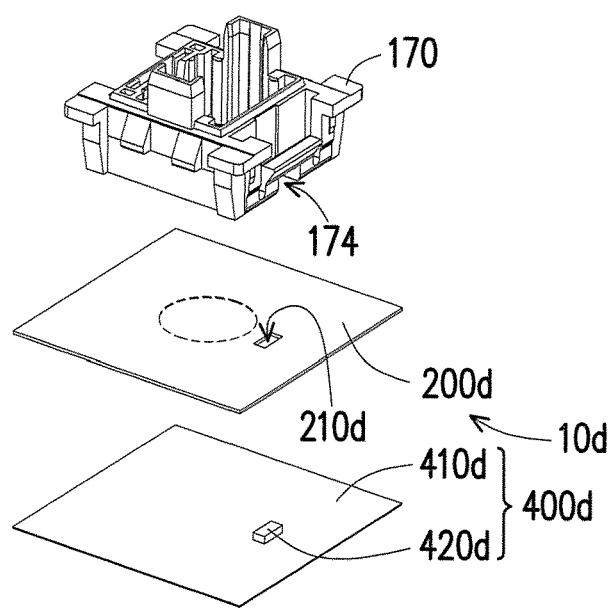

FIG. 6B is a three-dimensional exploded view of an input device according to another embodiment of the invention. Referring to FIG. 4B and FIG. 6B, the input device 10d of the present embodiment is similar to the input device 10a of FIG. 4B, and a difference there between is that the input device 10d of the present embodiment adopts the key structure 100a of FIG. 1B, and the input device 10d further includes a light source module 400d, which is disposed under the key structure 100a. In detail, the light source module 400d of the present embodiment includes a circuit board 410d and at least one light-emitting diode 420d electrically connected to the circuit board 410d. The thin-film circuit board 200d is located between the bottom cover 170 of the key structure 100a and the light source module 400d, wherein the thin-film circuit board 200d has a hole 210d corresponding to an accommodating portion 174 of the bottom cover 170, and the light-emitting diode 420d of the light source module 400d is disposed corresponding to the hole 210d of the thin-film circuit board 200d. Namely, the light of the light-emitting diode 420d can be transmitted upward to pass through the hole 210d of the thin-film circuit board 200d and the top cover 110 from the accommodating portion 174 of the bottom cover 170.

Figure 7:
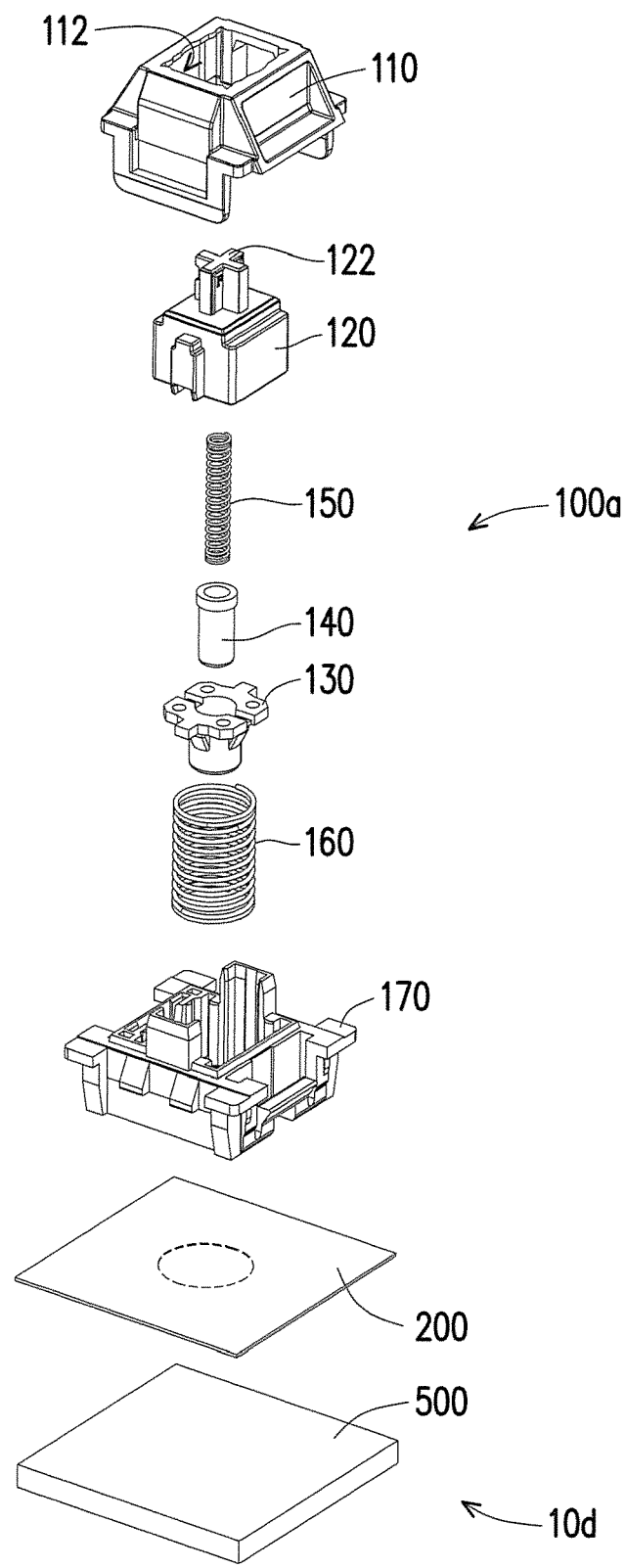
FIG. 7 is a three-dimensional exploded view of an input device according to another embodiment of the invention.

FIG. 7 is a three-dimensional exploded view of an input device according to another embodiment of the invention. Referring to FIG. 4B and FIG. 7, the input device 10d of the present embodiment is similar to the input device 10a of FIG. 4B, and a difference there between is that the input device 10d of the present embodiment adopts the key structure 100a of FIG. 1B, and the input device 10d of the present embodiment further includes a planar light source 500, which is disposed under the key structure 100a, where the thin-film circuit board 200 is located between the planar light source 500 and the key structure 100a. In brief, the planar light source 500 may provide a planar light to the key structure 100a to serve as the backlight source of the key structure 100a.

In summary, in the design of the key structure of the invention, since the key structure has the plunger, the sleeve, the rod, and the first elastic element, when the protruding portion of the plunger is pressed, the second elastic element is elastically deformed to make the rod passing through the bottom cover to contact an object (for example, the thin-film circuit board) to gain an reaction force, and the reaction force forces the rod to retract into the second opening of the bottom cover due to an elastic deformation of the first elastic element. In this way, the key structure of the invention has a handfeel and a trigger stroke of mechanical keys. Moreover, the design of the input device of the invention adopts the aforementioned key structure in collaboration with the thin-film circuit board, so that compared with the conventional mechanical keys in collaboration with a printed circuit board, the input device of the invention has advantages of a low cost and a light weight. In brief, the input device of the invention may have advantages of a handfeel of the mechanical keys and a low cost of the thin-film keys.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An input device, comprising:
   at least one key structure, comprising:
      a top cover, having a first opening;
      a plunger, assembled on the top cover, and having a protruding portion and a guiding portion connected to the protruding portion, wherein the protruding portion of the plunger protrudes from the first opening of the top cover;
      a sleeve, assembled inside the plunger;
      a rod, movably disposed in the sleeve;
      a first elastic element, disposed in the rod, wherein the guiding portion of the plunger passes through the first elastic element, so that a first end of the first elastic element leans against the plunger;
      a second elastic element, sleeving the sleeve; and
      a bottom cover, locked to the top cover, and having a second opening, wherein a second end and a third end of the second elastic element opposite to each other respectively lean against the sleeve and the bottom cover; and a thin-film circuit board, disposed under the key structure, wherein when the protruding portion of the plunger is pressed, the second elastic element is elastically deformed to make the rod to pass through the second opening on the bottom cover to contact the thin-film circuit to gain a reaction force, and the reaction force forces the rod to retract into the second opening and trigger the thin-film circuit board due to an elastic deformation of the first elastic element.

2. The input device as claimed in claim 1, further comprising:

at least one light source, disposed on the thin-film circuit board, and electrically connected to the thin-film circuit board, wherein the light source and the thin-film circuit board define a backlight module.

3. The input device as claimed in claim 1, wherein the key structure further comprises an elastic piece, inserted on the bottom cover, and configured to provide a section feel when the protruding portion of the plunger is pressed.

4. The input device as claimed in claim 1, wherein the key structure further comprises a keycap, assembled on the protruding portion of the plunger.

5. The input device as claimed in claim 1, further comprising:

a planar light source, disposed under the key structure, wherein the thin-film circuit board is located between the planar light source and the key structure.

6. The input device as claimed in claim 5, wherein materials of the top cover and the bottom cover of the key structure are all transparent materials.

7. The input device as claimed in claim 1, wherein the thin-film circuit board at least comprises a first patterned circuit thin-film, a second patterned circuit thin-film and an isolation thin-film, the isolation thin-film is located between the first patterned circuit thin-film and the second patterned circuit thin-film, and has a first through hole corresponding to the second opening of the bottom cover, when the protruding portion of the plunger is pressed, the rod contacts the first patterned circuit thin-film of the thin-film circuit board to deform the first patterned circuit thin-film and contacts the second patterned circuit thin-film through the first through hole of the isolation thin-film to trigger the thin-film circuit board.

8. The input device as claimed in claim 7, further comprising:

a light source module, disposed under the key structure, and comprising a circuit board and at least one light-emitting diode electrically connected to the circuit board, wherein the thin-film circuit board is located between the key structure and the light source module, the bottom cover of the key structure further has an accommodating portion, the thin-film circuit board has a hole corresponding to the accommodating portion of the bottom cover, and the light-emitting diode of the light source module is disposed corresponding to the hole of the thin-film circuit board.

9. The input device as claimed in claim 7, further comprising:

a light source module, disposed under the key structure, and comprising a circuit board and at least one light-emitting diode electrically connected to the circuit board, wherein the light source module is located between the key structure and the thin-film circuit board, the circuit board has a second through hole corresponding to the second opening of the bottom cover, and when the protruding portion of the plunger is pressed, the rod passes through the second through hole to contact the thin-film circuit board.

10. The input device as claimed in claim 9, wherein the bottom cover of the key structure further has an accommodating portion, and the light-emitting diode of the light source module is disposed corresponding to the accommodating portion of the bottom cover.

11. The input device as claimed in claim 7, wherein the first elastic element and the second elastic element are respectively a compression spring, and an external diameter of the second elastic element is greater than an external diameter of the first elastic element.

12. The input device as claimed in claim 11, wherein a diameter of the first through hole of the isolation thin-film is inversely proportional to a spring constant of the first elastic element.

* * * * *